United States Patent [19]

Winston

[11] 4,387,961
[45] Jun. 14, 1983

[54] COMPOUND PARABOLIC CONCENTRATOR WITH CAVITY FOR TUBULAR ABSORBERS

[76] Inventor: Roland Winston, 5217C S. University Ave., Chicago, Ill. 60615

[21] Appl. No.: 230,137

[22] Filed: Jan. 30, 1981

Related U.S. Application Data

[63] Continuation of Ser. No. 113,169, Jan. 18, 1980, abandoned.

[51] Int. Cl.³ .......................... G02B 5/10; F24J 3/02
[52] U.S. Cl. .................................. 350/296; 126/439; 126/442
[58] Field of Search .............................. 350/293–296, 350/299; 126/438, 439, 442, 443

[56] References Cited

U.S. PATENT DOCUMENTS 4,059,093  11/1977  Knowles et al. ............... 126/438 X
4,215,674  8/1980  Riggs et al. .......................... 126/438

Primary Examiner—F. L. Evans
Attorney, Agent, or Firm—David N. Koffsky; George M. Yahwak

[57] ABSTRACT

A compond parabolic concentrator with a V-shaped cavity is provided in which an optical receiver is emplaced. The cavity redirects all energy entering between the receiver and the cavity structure onto the receiver, if the optical receiver is emplaced a distance from the cavity not greater than 0.27 r (where r is the radius of the receiver).

4 Claims, 4 Drawing Figures

U.S. Patent   Jun. 14, 1983   Sheet 1 of 2   4,387,961
PRIOR ART
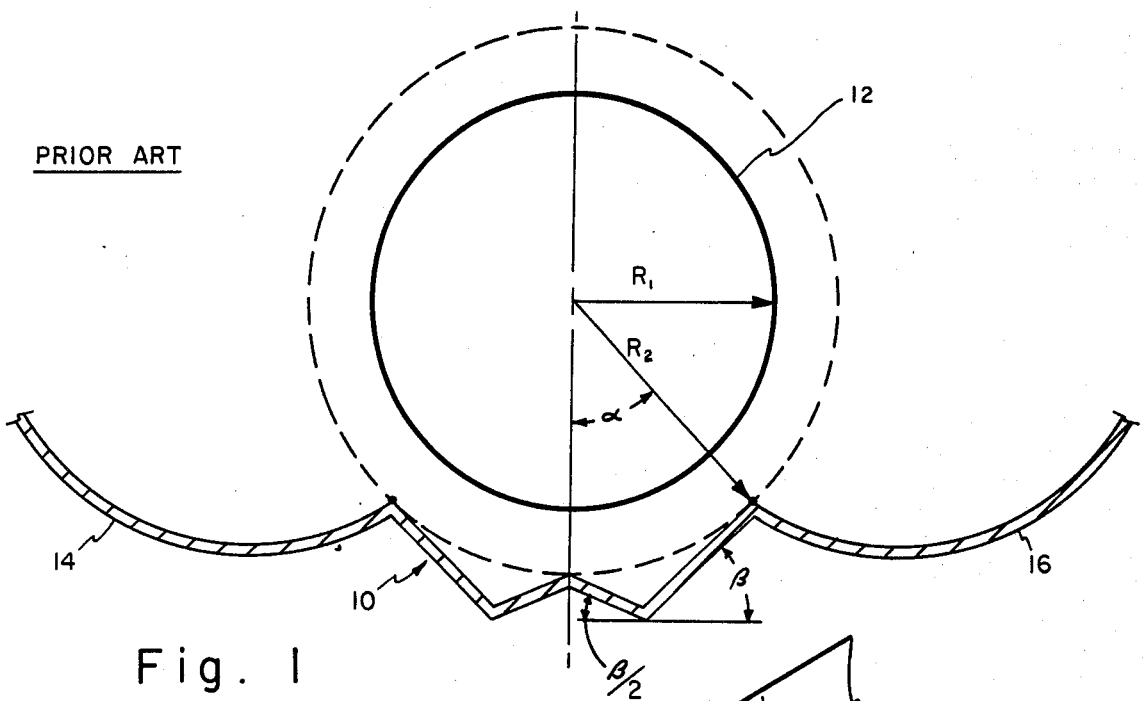
Fig. 1
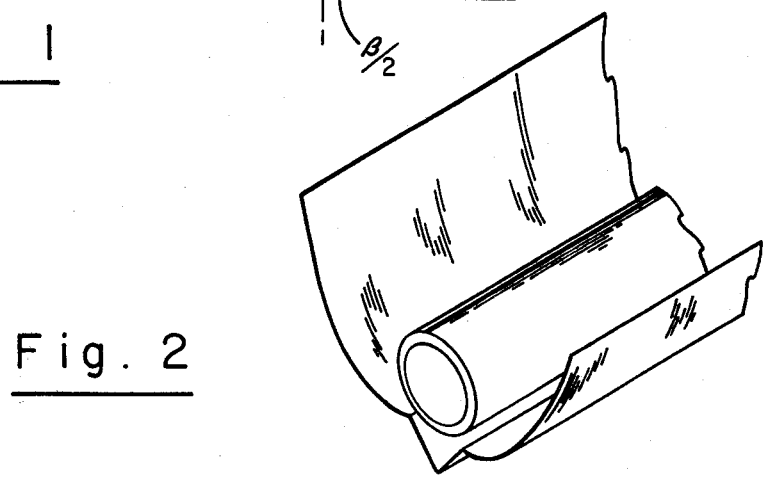
Fig. 2
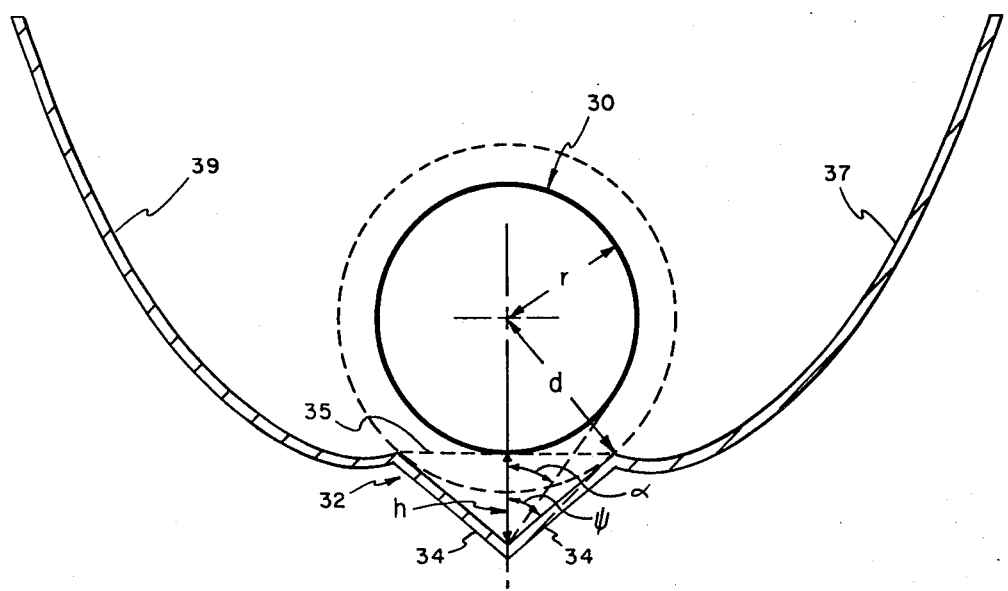

COMPOUND PARABOLIC CONCENTRATOR WITH CAVITY FOR TUBULAR ABSORBERS

This application is a continuation of application Ser. No. 113,169, filed Jan. 18, 1980 now abandoned.

BACKGROUND OF THE INVENTION

This invention relates to radiant energy collection and more particularly to a cavity design for reducing inherent losses in certain radiant energy collectors.

This invention relates to the subject matter of my copending patent application, Ser. No. 113,155, filed Jan. 18, 1980, now U.S. Pat. No. 4,359,265; assigned to the same assignee.

It is well-established that radiation which is partially collimated with an angular divergence of $\pm\theta$ can be concentrated on a receiver without transmission loss by the maximum concentration of $C_{max} = \sin\theta^{-1}$ through the use of nonimaging reflectors known generically in the art as compound parabolic concentrators. These concentrators are disclosed in my U.S. Pat. Nos. 3,923,381; 4,002,499; and 4,003,638 the disclosures of which are incorporated herein by reference. The compound parabolic concentrator (CPC) includes an energy receiver positioned between two trough-like sidewalls which reflect substantially all incident energy received over a predetermined included angle ($\pm\theta$) onto the energy receiver. The aforementioned patents teach that the profile curve of at least portions of the reflective sidewalls should be concavely shaped to assume the maximum possible slope consistent with reflecting maximum angle energy rays onto an energy receiver. In addition, U.S. Pat. No. 4,002,499 teaches, for a tubular energy receiver, that the lowermost portions of the sidewalls should form an involute of the shape of the energy receiver to maximize energy collection.

While the energy receiver shown in the '499 patent is the theoretical "optical design" receiver, practical designs dictate that a larger-than-theoretical receiver shape be emplaced between the sidewalls to ensure that placement tolerances, minor wall malformations, etc. do not significantly hinder the energy concentrator. More recently, it has been shown desirable to encompass the receiver in a vacuum bottle-like structure wherein the outermost surface is concentric to the inner receiver; is transparent; and encloses a vacuum between itself and the inner surface of the receiver (which itself may be coated with an energy selective surface).

To strictly meet the requirements of maximum concentration and no transmission loss in a CPC, the reflector surfaces should touch the optical design receiver. At times, this is not practical—especially when a larger-than-theoretical receiver is employed or when the receiver is enclosed in a transparent vacuum jacket.

In fact, it is desirable in most constructions that the actual receiver be offset somewhat from the reflector walls to prevent mechanical interferences when they are assembled. This offset reduces the efficiency of the system.

W. R. McIntire of the Argonne National Laboratory has developed a cavity/reflector design for the region below a tubular absorber. The McIntire cavity, for gaps between the cavity and the absorber of up to approximately half of the optical receiver radius, eliminates some of the losses referred to above. That design is shown in FIG. 1 and utilizes a trough-shaped cavity 10 positioned beneath the optical receiver 12. The "W" design (four linear segments) of cavity 10 ensures that no energy rays can enter the region between receiver tube 12 and cavity 10 without being reflected onto receiver 12. $R_1$ is the radius of the circular cross section of the optical receiver, and $R_2$ is the maximum distance which cavity 10 can be separated from the center of optical receiver 12. McIntire shows that for the four-segment cavity 10, $R_2$ should be no larger than $\sqrt{2}R_1$. McIntire also shows that when his "W" cavity is combined with a CPC concentrating structure, its capability to concentrate energy is somewhat degraded in comparison to the cusp-type CPC concentrator shown in U.S. Pat. No. 4,002,499.

One problem with the four-segment cavity 10, when it is combined with a CPC, is the complexity of manufacture of the structure. In other words, the more "bends" that are required in a mirrored surface, the more difficult it is to maintain the structural rigidity, optimum wall shape, and reflectivity of the trough.

It is, therefore, an object of this invention to provide an optical trough cavity which provides enhanced energy concentration ability.

It is another object of this invention to provide an optical reflecting cavity of simple construction which may be used in conjunction with a CPC structure.

SUMMARY OF THE INVENTION

A Compound Parabolic Concentrator with a V-shaped cavity is provided in which an optical receiver is emplaced. The cavity redirects all energy entering between the receiver and the cavity structure onto the receiver, if the optical receiver is emplaced a distance from the cavity not greater than $0.27r$ (where r is the radius of the receiver).

BRIEF DESCRIPTION OF THE DRAWINGS

FIG. 1 is a section drawing of the prior art detailing a retroreflective cavity.

FIG. 2 is a section and a partial isometric of a Compound Parabolic Concentrator which includes a reflecting trough constructed in accordance with the invention.

DETAILED DESCRIPTION

Referring to FIG. 2, tubular receiver 30 is emplaced in a V-trough cavity 32 whose wall segments 34 have the specific property that radiation incident on a segment 34 from outside the angular subtense of the receiver ($2\alpha$) is reflected onto receiver 30.

Figure 3:
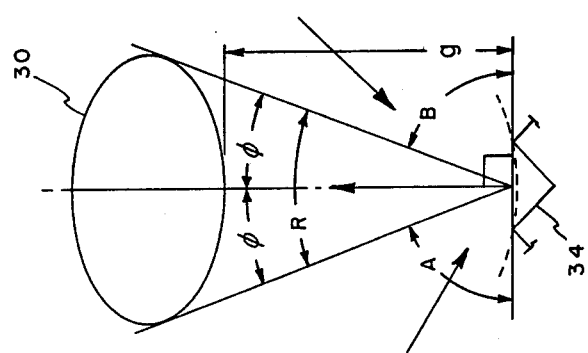
FIG. 3 is a construction which details the method for deriving the requisite dimensional relationships of the invention.

The detailed construction of V-trough 32 will be derived in conjunction with FIG. 3. In order to determine the distance g which can separate the aperture of trough 32 (dotted line 35 in FIG. 2) from the nearest point of receiver 30, it is necessary to understand that it is a requisite of trough 32 that it reflect all of the energy coming in from solid angles A and B and redirect it within the solid angle R. The second law of thermodynamics requires that the extent of solid angle R must be equal to or greater than the sum of the extents of solid angles A and B (based upon the assumption that this is a reflecting system). It can be shown that the following angular relationships exist:

$$R = 2 \sin \phi S \tag{1}$$

(where S = aperture dimension of trough 32)

$$A = (\sin 90 - \sin \phi)S \tag{2}$$

$$B = (\sin 90 - \sin \phi)S \tag{3}$$

The derivation of equations (1)–(3) can be found in "The Optics of Nonimaging Concentrators" by Welford and Winston, Academic Press, 1978, Section 2.7, pp. 20–25.

As stated above, the second law of thermodynamics requires that:

$$\begin{aligned} R &\geq A + B \\ R &\geq (1 - \sin\phi)2S \\ 2\sin\phi S &\geq (1 - \sin\phi)2S \\ \sin\phi &\geq \tfrac{1}{2} \\ \phi &\geq 30° \end{aligned} \tag{4}$$
$$\tag{5}$$

Equation (5) shows that $\phi$ can be no less than 30°, and therefore, the allowable gap between receiver 30 and trough 32 is thus constrained. For example, for a cylindrical receiver of radius r, the relationship indicates that the gap distance must be $g \leq r$.

Figure 4:
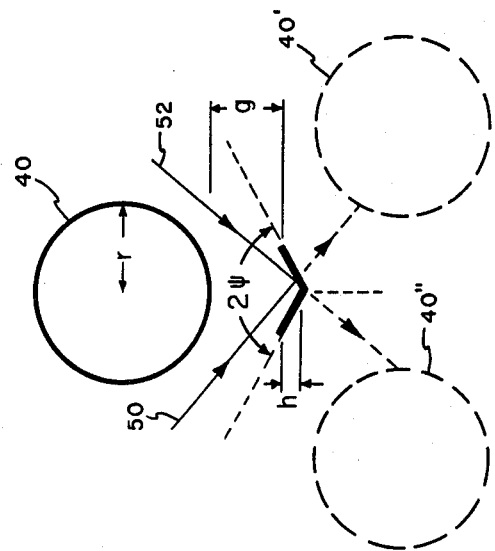
FIG. 4 is a construction useful in deriving the interrelationships between a V-shaped reflective segment and an energy receiver.

As aforesaid, a reflecting V groove of appropriate opening angle and height will provide the necessary reflection capability called for by equation (5). The construction of such a V groove is shown in FIG. 4. To illustrate, a cylindrical receiver 40 of radius r is chosen, and the gap g between the receiver and the aperture of the groove is chosen close to r. Using the method taught by Williamson [D. E. Williamson, "Cone Channel Condensor Optics", *Journal of the Optical Society of America*, Vol. 42, pp. 712–715, (1952)], angular constructions are created equivalent in angle to the opening angle of the V groove (in this case 118°), and receivers 40' and 40" are constructed in the identical relationship as receiver 40 has to the V groove. By then tracing light beams 50 and 52 and projecting them through the legs of the V groove, it can be seen that they intersect receivers 40' and 40". This indicates that light beams 50 and 52, when reflected by the V groove, will in fact be redirected onto the surface of receiver 40. It is apparent from FIG. 4 that radiation from outside the solid angle of the receiver 40 will invariably be reflected onto receiver 40.

More generally, it is possible to work out limits on the opening angle ($2\psi$) and the height (h) of the V groove for any gap distance where the gap distance (g) is less than r. Thus, for V grooves of a small height (h), where h is much less than the radius r of the receiver (h<<r), the V groove constraints can be determined as follows (1) The distance between the apex of the V groove and the center of the receiver is chosen and must be less than 2r, for a circular receiver (g<r).

(2) The angle of the V groove, ($2\psi$), has the following limits:

$$\left.\begin{aligned} 2\psi &\leq 90° + \phi \\ 2\psi &\geq 180° - 2\phi \end{aligned} \quad \text{where } \phi > 30° \right\} \tag{6}$$

(3) The maximum height (h) of the V groove can then be determined from the following relationship:

$$h \leq r \cot^2\psi + g(\cot^2\psi - 1)/2 \tag{7}$$

The above relationship provides the maximum height (h) of the V groove, however, of course, it can always be truncated without loss of performance.

In case the condition h<<r is not met, $\phi$ in Equation (6) should be replaced by:

$$\alpha = \sin^{-1}[r/(r+g+h)] \tag{8}$$

where $\alpha$ is the half angle subtended by tangents to the receiver drawn from the apex of the V groove (see FIG. 2). Thus, one first chooses $\alpha$, then $\psi$, and finally h to complete the design.

The aforementioned sets the allowable dimension limits on V-troughs which are employed as ideal, reflecting cavities. When the cavity size is near its permissible upper limit, the V-troughs are small in comparison to the receiver. As the distance between receiver and cavity wall decreases, equations (6), (7), and (8) show that the V-trough increases in size. When the wall of the trough is allowed to touch the receiver, no cavity is needed.

It has been found that for a range of small separation distances between receiver and wall, a single V-trough can span the entire cavity. This range of distances can be calculated from the formulae by setting g=0 so that the aperture of the V-trough grazes the aperture 35 of the receiver. From FIG. 2, $$d = \sqrt{r^2 + (h\tan\psi)^2} \tag{9}$$

From equation (7)

$$h \leq r \cot^2\psi$$

so that $$h \tan\psi \leq \sqrt{hr} \tag{10}$$

$$d \leq \sqrt{r^2 + hr}$$

Therefore, for maximum separation distance (d−r), it is desired that h be as large as possible. But h is constrained by $\sin \alpha = r/(r+h)$; therefore, the limits on the angle $\alpha$ need to be determined. The following relationships are used:

$$\sin \alpha = r/(r+h)$$

and $$h \leq r \cot^2\psi$$

to obtain $$\sin \alpha \geq 1/(1 + \cot^2\psi) = \sin^2\psi \tag{11}$$

From $\psi \geq 90° - \alpha$, $\sin \psi \geq \cos \alpha$ so that $$\sin \alpha \geq \cos^2\alpha = 1 - \sin^2\alpha$$

$$\sin^2\alpha + \sin \alpha \geq 1 \tag{12}$$

Solving this equation gives $$\sin\alpha \geq (\sqrt{5} - 1)/2 \tag{13}$$

$$\alpha \gtrsim 38.2°$$
$$\psi \approx 51.8°$$

Therefore, the upper limit of separation allowed by a single trough-shaped V groove cavity occurs at $\alpha \approx 38.2°$. Then $h \approx 0.617r$.

$$(d-r) \lesssim 0.27r \tag{14}$$

This separation is adequate, for example, to enable the use of single V trough with a dewar-type "vacuum bottle" solar receiver. Thus, as shown in FIG. 2, a properly designed V trough and CPC walls 37, 39 can be mated so that, even though the receiver 30 does not touch the sidewalls of the CPC, the combination provides for nearly ideal energy collection and concentration.

I claim:

1. In combination with a tubular energy receiver, a Compound Parabolic Concentrator trough having an opening adapted to be oriented toward a source of radiant energy, said trough provided with reflective concave sidewalls, a portion of each of which is shaped to assume the maximum possible slope consistent with reflecting maximum angle energy rays onto said energy receiver, each of said sidewalls terminating and joined to a reflective trough-shaped cavity, said cavity comprising: a pair of substantially planar walls joined at an apex and arranged in a V-shape wherein the mouth of said V forms an aperture; said tubular energy receiver being placed no further from said apex than tangent to said aperture.

2. The invention as in claim 1 wherein the apex of said V trough is a distance h from the tubular receiver so that the angular subtense $2\alpha$ of said receiver as seen from said apex is $\gtrsim 2(38.2°)$.

3. The invention as in claim 2 wherein said tubular receiver is circular in cross section and of radius r, and the distance between the nearest point of said receiver and said point of joining between said concave sidewalls and planar walls is $\leq 0.27r$.

4. In combination with an energy receiver, a trough having an opening adapted to be oriented toward a source of radiant energy, said trough provided with reflective concave sidewalls, a portion of each of which is shaped to assume the maximum possible slope consistent with reflecting maximum angle energy rays onto said energy receiver, each of said sidewalls terminating and joined to a reflective trough-shaped cavity, said cavity comprising: a pair of substantially planar walls joined at an apex and arranged in a V-shape wherein the mouth of said V forms an aperture; said aperture placed a distance from the nearest point of said energy receiver such that the angular subtense $2\phi$ of said receiver as seen from said energy aperture is $\geq 60°$, whereby said V-shaped walls are positioned to reflect all energy incident thereon from outside said angular subtense $2\phi$, to within said angular subtense $2\phi$.

* * * * *